R. RIEHL.
WHEEL.
APPLICATION FILED DEC. 12, 1910.

1,003,123.

Patented Sept. 12, 1911.

Witnesses
J. Milton Lester
B. P. Fishburne

Inventor
Robert Riehl
By C. L. Parker
Attorney

UNITED STATES PATENT OFFICE.

ROBERT RIEHL, OF ST. LOUIS, MISSOURI.

WHEEL.

1,003,123.

Specification of Letters Patent. Patented Sept. 12, 1911.

Application filed December 12, 1910. Serial No. 596,822.

*To all whom it may concern:*

Be it known that I, ROBERT RIEHL, a citizen of the United States, residing at St. Louis, in the State of Missouri, have invented certain new and useful Improvements in Wheels, of which the following is a specification.

My invention relates to a resilient wheel which is adapted to fulfil the functions of a wheel equipped with an ordinary pneumatic tire.

An important object of my invention is to provide a wheel of the above character, by the employment of which the advantages afforded by the pneumatic tire may be had, without the expense and trouble occasioned by such tire.

A further object of my invention is to provide a resilient wheel for automobiles or other vehicles, which is comparatively light, strong and durable, and which is capable of absorbing shocks as is a wheel equipped with a pneumatic tire.

Other objects and advantages of this invention will be apparent during the course of the following description.

Figure 1:
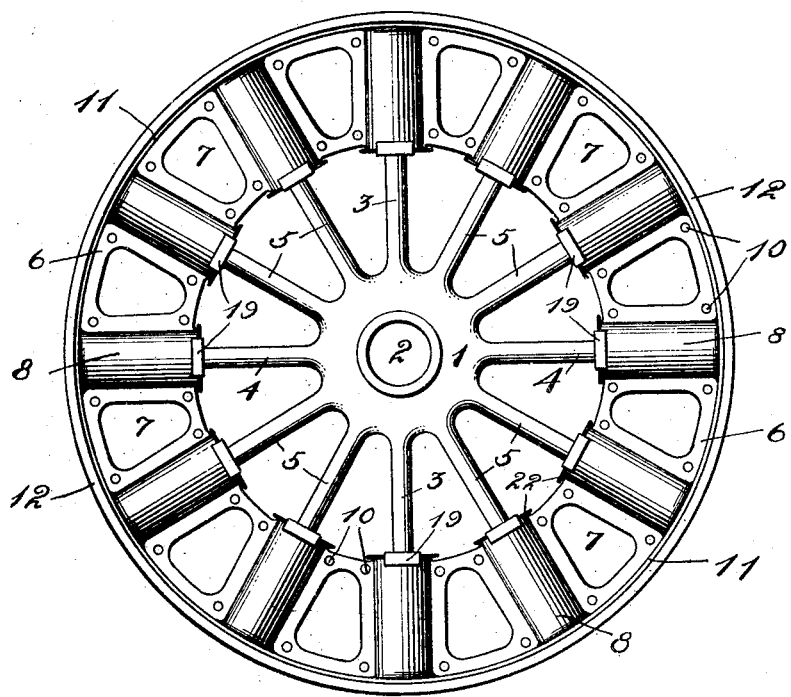
Figure 2:
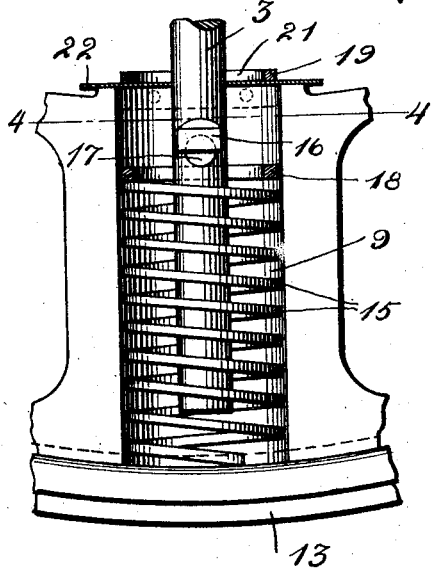
Figure 4:
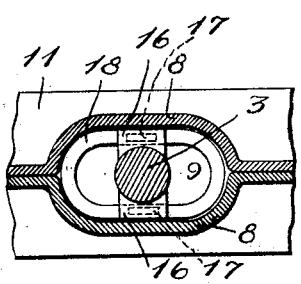
Figure 3:
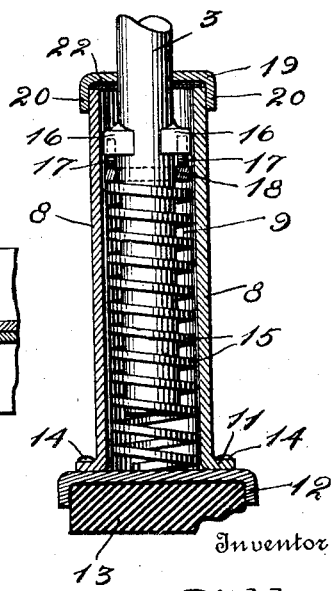

In the accompanying drawings forming a part of this specification, and in which like numerals are employed to designate like parts throughout the same, Figure 1 is a side view of the wheel complete, Fig. 2 is an enlarged detail view of a portion of one of the ring-members, showing a socket for the spoke and associated members. Fig. 3 is an enlarged sectional view, taken through the ring-member and rim, at right angles to the plane of rotation of the wheel, and Fig. 4 is a sectional view taken on line 4—4 of Fig. 2.

In the drawings, wherein is illustrated a preferred embodiment of my invention, the wheel is shown as comprising a hub 1, having the usual opening 2, formed therethrough, for receiving an axle (not shown). This hub carries spokes 3, 4 and 5, which are rigidly connected with the hub 1 by any suitable means. The spokes may preferably be formed of steel, although any other suitably strong material such as hard wood, may be employed.

Arranged normally in concentric relation with the hub 1 and about the same, as shown, is a pair of twin ring-members 6 which are preferably formed of sheet-metal or steel. These ring-members may preferably have portions of their material stamped out, to form openings 7, whereby the weight of the wheel is reduced. The ring-members 6 form what is generally termed the felly of a wheel, the term felly, however, being generally applicable to a wooden annular structure. The ring-members 6 are provided at equal spaced intervals with registering pairs of preferably substantially semi-elliptical portions 8, pressed from the material of the ring-members 6. The pairs of substantially semi-elliptical portions 8, form substantially elliptical casings or sockets 9, for receiving the outer ends of the spokes, as shown. The ring-members 6 may be suitably secured together by any desired means, such as bolts or rivets, as shown at 10. The ring-members 6 are provided upon their periphery with outwardly extending annular flanges 11, upon which is disposed a metallic rim 12, adapted for the reception of a solid rubber or leather tire 13. The rim 13 is bolted or riveted to the flanges 11, as shown at 14.

Each of the spokes and the means for yieldingly supporting the same are alike, and therefore a description of one of the spokes will suffice. As shown in Fig. 3, the outer end portion of the spoke 3 is disposed within the casing or socket 9, the spoke 3 being capable of moving longitudinally and transversely of said socket in a plane of the wheel, by virtue of the elongated shape in cross-section of said socket. The longitudinal movement of the spoke 3 is limited, when its outer end engages the rim 12. Disposed within the casing or socket 9 and in engagement with the rim 12, is a compressible coil spring 15, having substantially semi-elliptical turns, as shown, which are of the proper size to fit snugly within the socket 9. This compressible coil spring is to have a desired degree of stiffness, corresponding to the load to be supported thereby. The spoke 3 carries within the socket 9, a pair of preferably diametrically disposed extensions or lugs 16, having recesses formed therein for the reception of anti-friction means, in the form of roller-bearings 17. These roller-bearings engage a substantially elliptical washer 18, which in turn engages the spring 15. A cap 19 is mounted upon the inner end of the socket 9 and has outwardly bent ends 20, which straddle and are suitably connected with said socket. This cap 19 is provided with an elongated opening 21 to permit of the above referred to lateral movement of the spoke. Slidably mounted between the cap 19 and socket 9, is a dust guard in the form of a flat plate 22, having its ends extending beyond said socket, as shown.

In the operation of the wheel, assuming the same to be carrying a load, when the wheel is bumped or jarred, the vertically disposed spokes 3 will reciprocate longitudinally, while the horizontally disposed spokes 4 will reciprocate laterally, and the spokes 5 will have a movement which is a resultant of the two above referred to movements.

I wish it understood that the form of my invention herewith shown and described is to be taken as a preferred example of the same, and that certain changes in the shape, size and arrangement of parts may be resorted to without departing from the spirit of my invention or the scope of the subjoined claims.

Having thus described my invention, I claim:—

1. In a wheel of the character described, a hub, a spoke connected therewith, a rim structure provided with a socket having a substantially elliptical opening for receiving the spoke to permit the same to move laterally in the plane of the wheel, a compressible coil spring fitting snugly within said socket and having substantially elliptical turns, and roller-bearings connected with said spoke to compress the coil spring.

2. In a wheel of the character described, a hub, spokes connected therewith, a rim structure comprising a plurality of spaced connected sockets for receiving the outer portions of the spokes, compressible coil springs fitting snugly within said sockets and having substantially elliptical turns whereby said spokes have their outer portions disposed within the axial openings of the springs, and said spokes are capable of lateral movement in the plane of the wheel, lugs connected with the spokes, and rollers engaging said lugs to compress the springs upon longitudinal movement of the spokes.

In testimony whereof I affix my signature in presence of two witnesses.

ROBERT RIEHL.

Witnesses:
ANTHONY F. ITTNER,
JOSEPH BLOCK.

---

Copies of this patent may be obtained for five cents each, by addressing the "Commissioner of Patents, Washington, D. C."